(12) United States Patent
Nuriel et al.

(10) Patent No.: US 10,162,737 B2
(45) Date of Patent: Dec. 25, 2018

(54) EMULATING A USER PERFORMING SPATIAL GESTURES

(71) Applicant: HEWLETT PACKARD ENTERPRISE DEVELOPMENT LP, Houston, TX (US)

(72) Inventors: Roy Nuriel, Yehud (IL); Pablo Retyk, Yehud (IL); Doron Levi, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 171 days.

(21) Appl. No.: 15/114,070

(22) PCT Filed: Feb. 20, 2014

(86) PCT No.: PCT/US2014/017294
§ 371 (c)(1),
(2) Date: Jul. 25, 2016

(87) PCT Pub. No.: WO2015/126392
PCT Pub. Date: Aug. 27, 2015

(65) Prior Publication Data
US 2016/0364321 A1 Dec. 15, 2016

(51) Int. Cl.
*G06F 9/44* (2018.01)
*G06F 9/45* (2006.01)
(Continued)

(52) U.S. Cl.
CPC ............ *G06F 11/3676* (2013.01); *G06F 3/01* (2013.01); *G06F 3/011* (2013.01); *G06F 3/017* (2013.01);
(Continued)

(58) Field of Classification Search
CPC ............ G06F 11/3688; G06F 11/3664; G06F 11/3684; G06F 9/44589; G06F 9/45504; G06F 11/261
See application file for complete search history.

(56) References Cited

U.S. PATENT DOCUMENTS

| 8,275,834 B2 | 9/2012 | Aldunate et al. |
| 8,448,056 B2 | 5/2013 | Pulsipher et al. |

(Continued)

OTHER PUBLICATIONS

Paul et al., "Hand Gesture Recognition Library", International Journal of Science and Applied Information Technology, vol. 3, No. 2, Mar. 2014, pp. 44-50; <https://arxiv.org/ftp/arxiv/papers/1507/1507.05243.pdf>.*

(Continued)

*Primary Examiner* — Benjamin C Wu
*Assistant Examiner* — Ben C Wang

(57) ABSTRACT

Examples disclosed herein provide tools for capturing spatial gestures performed by a user and scripting the gestures for testing an application under test. Scripts may be produced by capturing movement of extremities of a skeletal body corresponding to the user, wherein the movement is captured according to a change in coordinates of the extremities from an original position. The movement of the extremities may be matched to a predefined gesture found in a gesture database. A script may be generated from the matched predefined gesture with reference to the extremities captured and coordinates of the extremities from the original position, such that the user is emulated.

4 Claims, 5 Drawing Sheets

(51) Int. Cl.
*G06F 11/36* (2006.01)
*G06F 3/01* (2006.01)
*G06F 9/445* (2018.01)

(52) U.S. Cl.
CPC ............... *G06F 9/44* (2013.01); *G06F 11/36* (2013.01); *G06F 11/3684* (2013.01); *G06F 9/44589* (2013.01); *G06F 11/3688* (2013.01)

(56) References Cited

U.S. PATENT DOCUMENTS

| | | | | |
|---|---|---|---|---|
| 8,553,001 | B2* | 10/2013 | Krishnaswamy ... | G06F 3/04883 178/18.01 |
| 9,154,611 | B1* | 10/2015 | Jackson ............... | H04W 4/029 |
| 9,342,237 | B2* | 5/2016 | Zeng ....................... | G06F 17/30 |
| 9,378,109 | B1* | 6/2016 | Phadke .............. | G06F 11/2221 |
| 9,747,191 | B1* | 8/2017 | Marolia .............. | G06F 11/3664 |
| 9,996,454 | B1* | 6/2018 | Greer ................... | G06F 11/3688 |
| 2008/0010537 | A1* | 1/2008 | Hayutin ............. | G06F 11/3664 714/38.14 |
| 2009/0213083 | A1 | 8/2009 | Dicker et al. | |
| 2012/0089905 | A1 | 4/2012 | Randall et al. | |
| 2012/0092286 | A1* | 4/2012 | O'Prey ................. | G06F 3/0416 345/174 |
| 2012/0204155 | A1 | 8/2012 | Ben-Artzi et al. | |
| 2012/0214594 | A1 | 8/2012 | Kirovski et al. | |
| 2012/0309532 | A1 | 12/2012 | Ambrus et al. | |
| 2013/0063448 | A1 | 3/2013 | Fields et al. | |
| 2013/0093675 | A1* | 4/2013 | Lin ......................... | G06F 3/033 345/158 |
| 2013/0120280 | A1* | 5/2013 | Kukulski ............ | G06F 3/04883 345/173 |
| 2013/0127733 | A1* | 5/2013 | Krishnaswamy ... | G06F 3/04883 345/173 |
| 2013/0290875 | A1* | 10/2013 | Dixit ................... | G06F 11/3664 715/760 |
| 2013/0293454 | A1 | 11/2013 | Jinyoung et al. | |
| 2014/0132571 | A1* | 5/2014 | Zeng ....................... | G06F 17/30 345/178 |
| 2014/0191998 | A1* | 7/2014 | Chuang .................. | G06F 3/017 345/173 |
| 2017/0024308 | A1* | 1/2017 | Knoulich .................. | G06F 8/60 |
| 2018/0060222 | A1* | 3/2018 | Kogan ................ | G06F 11/3688 |

OTHER PUBLICATIONS

Dover et al., "Improving Gestural Interaction With Augmented Cursors", ACM, Oct. 2015, pp. 135-138; <https://dl.acm.org/citation.cfm?id=2985765>.*

Wetzlmaier et al., "Test Automation for Multi-touch User Interfaces of Industrial Applications", IEEE, Apr. 2015, pp. 1-3; <https://ieeexplore.ieee.org/stamp/stamp.jsp?tp=&arnumber=7107468>.*

HCL Technologies Limited, "Engineering and R&D Services," (Web Page), Feb. 22, 2013 2 pages, available at http://www.hcltech.com/engineering-rd-services/device-test-automation-framework.

International Search Report & Written Opinion received in PCT Application No. PCT/US2014/017294, dated Oct. 31, 2014, 9 pages.

International Preliminary Report on Patentability received in PCT Application No. PCT/US2014/017294, dated Sep. 1, 2016, 6 pages.

Khandkar, S.H. et al., "Tool Support for Testing Complex Multi-Touch Gestures," (Research Paper), ACM International Conference on Interactive Tabletops and Surfaces, Nov. 7-10, 2010, 10 pages, available at http://www.dfki.de/its2010/papers/pdf/fp228.pdf.

* cited by examiner

EMULATING A USER PERFORMING SPATIAL GESTURES

BACKGROUND

Software applications have used controls to allow users to manipulate aspects of the application. Such controls may be input using, for example, controllers, remotes, keyboards, mice, or the like. In addition, software applications may employ cameras and software gesture recognition engines to provide a human computer interface (HCI) or natural user interface (NUI). With HCI or NUI, user motions are detected within a field of view of the cameras, and some motions or poses may represent gestures which are used to control aspects of the software application. NUI may allow for a user to interact with a software application in a more natural way compared to other forms of input made, for example, via a keyboard and/or mouse.

DRAWINGS

DETAILED DESCRIPTION

In software testing, test automation is the use of software, separate from the software application being tested (i.e., application under test), to control the execution of tests and the comparison of actual outcomes with predicted outcomes. Test automation is a key capability for software development organizations for developing robust software applications in a cost-effective manner. Test automation can automate some repetitive but necessary tasks in a formalized testing process already in place, or add additional testing that may have challenges in performing manually. Such tasks may be included in a script, a program written for a computing environment that can interpret and automate the execution of the tasks during software testing. Test automation tools may help with the maintenance of applications by reducing the likelihood that changes introduce errors in previously working features of the application and getting faster validation on the application.

Examples disclosed herein provide test automation tools for capturing user motions via a NUI (e.g., an optical camera or sensor) and scripting the motions for testing an application under test (e.g., recording and encapsulating the user motions into a form that may be executed or replayed during software testing). The scripts generated may be used for emulating the user motions during software testing, preferably in a manner such that a computing environment cannot differentiate between the emulated user and the actual user.

Figure 1:
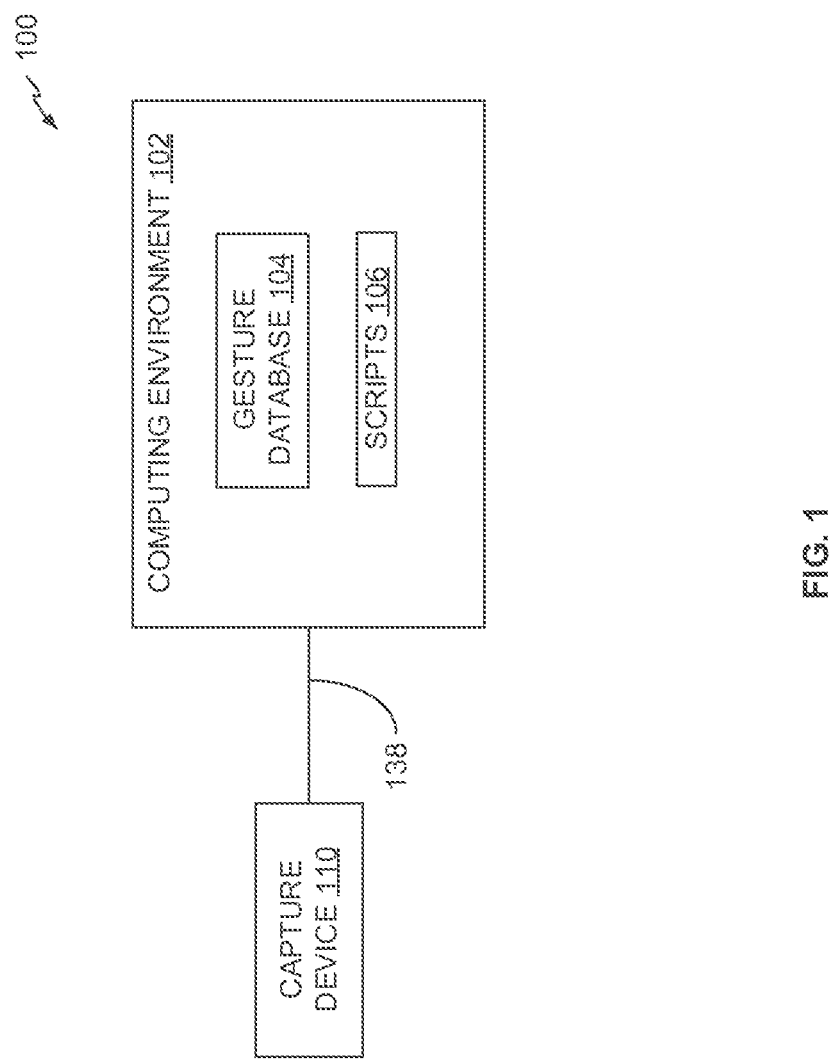
FIG. 1 depicts an environment in which various embodiments may be implemented for detecting user motions.

FIG. 1 depicts an environment 100 in which various embodiments may be implemented for detecting user motions. Environment 100 is shown to include a computing environment 102, which represents generally any combination of hardware and programming configured to execute software applications. Although it is not illustrated, the environment may include an audio/visual device for providing audio and/or visual representations from the software application. The environment 100 further includes a capture device 110, which represents generally any device or combination of devices configured to capture positions and movements performed by the user in the field of view of the capture device 110, which the computing environment 102 may receive, interpret, and use to control software applications, as will be further described.

As an example, the positions and movements performed by the user may include spatial gestures for controlling the software applications. Examples of the capture device 110 include any number of optical systems with active, passive or marker less systems, or inertial, magnetic mechanical systems (e.g., depth camera or RGB camera). As shown in FIG. 1, the capture device 110 may be in communication with the computing environment 102 via a communication link 138. The communication link 138 may be a wired connection including, for example, a USB connection, a Firewire connection, an Ethernet cable connection, or the like and/or a wireless connection such as wireless 802.11b, g, a, or n connection.

As an example, the computing environment 102 may provide a clock to the capture device 110 that may be used to determine when to capture, for example, a scene via the communication link 138. As a result, movements/motions of a subject may be sampled many times per second to record the movements of the subject and translate the movements to a digital model. A variety of known techniques exists for determining whether a target or object detected by the capture device 110 corresponds to a human target. Skeletal mapping techniques may then be used to determine various spots (e.g., feature points or extremities) on that user's skeleton (e.g., joints of the hands, wrists, elbows, knees, neck, ankles, shoulders, and where the pelvis meets the spine). A skeletal mapping is one example of a computer model of a user, and other computer models/techniques may be used. For example, other techniques include, but are not limited to, transforming the captured image into a body model representation of the person and transforming the image into a mesh model representation of the person.

With regards to skeletal mapping techniques, motion capture data may be the recorded or combined output of the capture device 110 translated to a three dimensional model. As an example, the capture device 110 may track one or more feature points of the user in space relative to its own coordinate system. For example, a 3-D orthogonal coordinate reference system may be defined within the center of the field of view of the capture device 110, and a skeletal model of the user may be derived from each captured image based on the tracked feature points. The skeletal model may include one or more extremities for each body part and a joint between adjacent skeletal members. As mentioned above, the extremities may include, but are not limited to joints of the hands, wrists, elbows, knees, neck, ankles, shoulders, and where the pelvis meets the spine. It is understood that one or more of the points may be omitted and/or others may be added.

Each of the points may be described in the 3-D Cartesian space by an x, y, and z coordinate in a frame of reference with respect to the capture device 110 (e.g., defined within the center of the field of view of the capture device 110). As the user moves in physical space (e.g., within the field of view of the capture device 110), the capture device 110 may be used to adjust the skeletal model such that the skeletal model may accurately represent the user. For example, as the user moves, information from the capture device 110 may be used to adjust a pose and/or the fundamental size/shape of the model in each frame so that it accurately represents the target (i.e., the user). As a result, the points on the model may be utilized to track the user's movements, which may then be provided to corresponding applications which use the data for a variety of purposes (e.g., controlling aspects of an application).

The computing environment 102 may further determine which controls to perform in an application executing on the computing environment 102 based on, for example, spatial gestures by the user that have been recognized from the skeletal model. Referring back to FIG. 1, the computing environment 102 may include a gesture database 104. The gesture database 104 may in general include a collection of gesture filters, each comprising information concerning a predefined gesture that may be performed by the skeletal model (e.g., as the user moves). The predefined gestures may include information indicating which extremities of the skeletal model may perform the gesture. For example, a predefined gesture indicating the waving of a hand may include information that either the left hand or the right hand may perform the gesture. As a result, if the user performs a spatial gesture involving the waving of either the left or right hand, the spatial gesture may be matched with the predefined gesture in the gesture database 104 indicating the waving of a hand. The predefined gesture indicating the waving of a hand may be generic to all supported extremities (e.g., left hand and/or right hand).

The data captured by the capture device 110 in the form of the skeletal model, and movements associated with it may be compared and matched to the gesture filters in the gesture database 104 to identify when a user (as represented by the skeletal model) has performed one or more of the predefined gestures. As an example, the data captured by the capture device 110 may indicate a movement of one or more extremities of the skeletal model corresponding to the user, such that the movement is captured according to a change in coordinates of the extremities from an original or previous position. The change in coordinates may provide vectors and the angle relative to the previous position in order to determine the movement of the extremities.

As an example, if the user waves the right hand, the data captured by the capture device 110 between two consecutive capture frames may indicate a change of coordinates with at least the wrist of the right hand. The movement of the extremities may then be matched to a gesture filter found in the gesture database 104 (e.g., a predefined gesture indicating a hand wave). As an example, the gesture filters in the gesture database 104 may include the movement of multiple extremities or feature points for a gesture. For example, a gesture indicating the raising of a hand may include a change in coordinates of at least the wrist, elbow, and/or shoulder of an arm. Other factors that may be taken into consideration when the computing environment 102 determines which controls to perform in an application include the distance between the coordinates of the extremities moved between consecutive frames captured by the capture device 110, and the velocity at which the movements occur, as will be further described.

The matched gestures may be associated with various controls of an application. Thus, the computing environment 102 may use the gesture database 104 to interpret movements of the skeletal model and to control an application based on the movements. As an example, gesture data corresponding to user input or activity may be compared to stored gesture data to determine whether a user has successfully performed a specific activity.

Referring back to FIG. 1, upon detecting gestures performed by a user, as described above, the gestures may be included in scripts 106 that are used for test automation purposes. The gestures recorded in a script 106 may be later executed and replayed during test automation of an application under test within the environment 100. The scripts 106 generated may be used for emulating gestures performed by the user during software testing, preferably in a manner such that the computing environment 102 cannot differentiate between the emulated user and the actual user.

Figure 2:
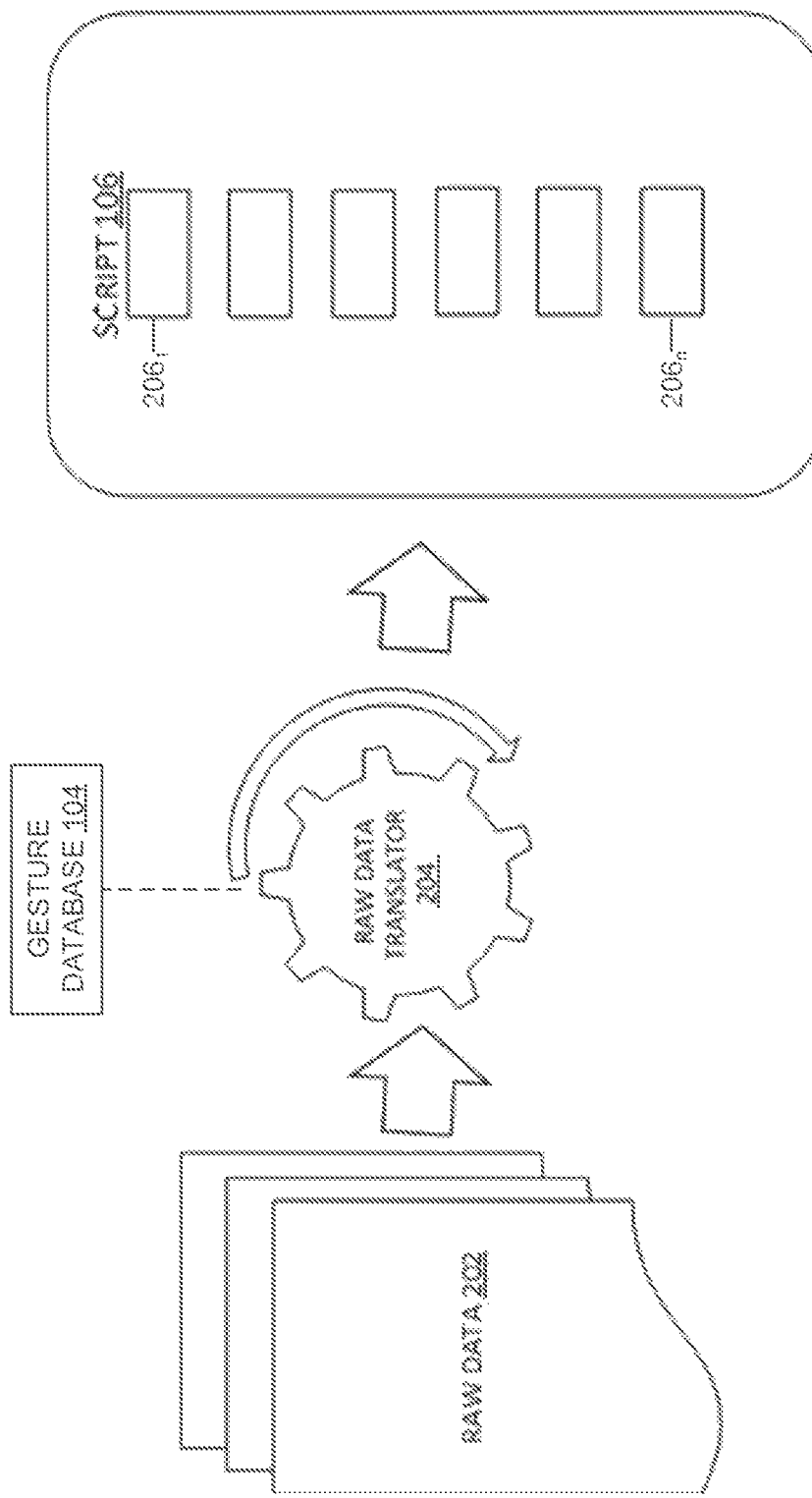
FIG. 2 illustrates the generation of a script that may be used for test automation purposes, according to one example.

FIG. 2 illustrates the generation of a script 106 that may be used for test automation purposes, according to one example. The script 106 may be recorded by the computing environment 102 from raw data 202 captured via the capture device 110. The script 106 may include one or more gestures 206 (e.g., $206_1$-$206_n$). As previously mentioned, the computing environment 102 may provide a clock to the capture device 110 to capture or record movements/motions of a user, for example, many times per second and translate the movements to a digital model (e.g., using skeletal mapping techniques) in order to generate the raw data 202.

While a script 106 is being recorded, the capture device 110 may capture irrelevant movements performed by a user until a gesture is performed, or while a gesture is performed. As an example, the user may filter the irrelevant data from the raw data 202 prior to the generation of the script 106. For example, if the user desires to create a new script which includes at least the waving of the right hand, and the capture device 110 also captures movement of the left hand, the user may filter data from the raw data 202 corresponding to the movement of the left hand prior to generation of the script 106.

Referring back to FIG. 2, when recording a new script 106 the raw data 202 may be translated to gestures by a raw data translator 204 of the computing environment 102. As an example, the raw data translator 204 may match the movement of the extremities found in the raw data 202 to a predefined gesture found in the gesture database 104, as described above with regards to the gesture filters included in the gesture database 104. Upon matching the movement of the extremities to a gesture filter, the computing environment 102 may add the matched predefined gesture (e.g., $206_1$) to script 106. A script 106 may include multiple gestures (e.g., $206_1$-$206_n$) as captured by the capture device 110, as indicated.

As an example, if the movement of the extremities found in the raw data 202 indicates a wave of the right hand, the raw data translator 204 may match the movement to a predefined gesture indicating a hand wave. The predefined gesture indicating a hand wave may have coordinates originating from a center of the field of view of the capture device 110, which may be different from the coordinates of the original position of the right hand in the raw data 202 (e.g., coordinates of the wrist of the right hand prior to the hand wave), in order for the script 106 to accurately emulate the hand wave of the actual user from the original position, the gesture added to the script 106 may be generated from the matched predefined gesture with reference to the coordinates of the extremities from the original position. For example, when the user is emulated via the script 106, an offset may be applied to the coordinates of the matched predefined gesture to emulate movement of the extremities from the original position, as will be further described. Other factors that may be taken into consideration when replaying the script 106 include a velocity and the distance of the change in coordinates of the extremities from the original position, as will be further described.

Figure 3:
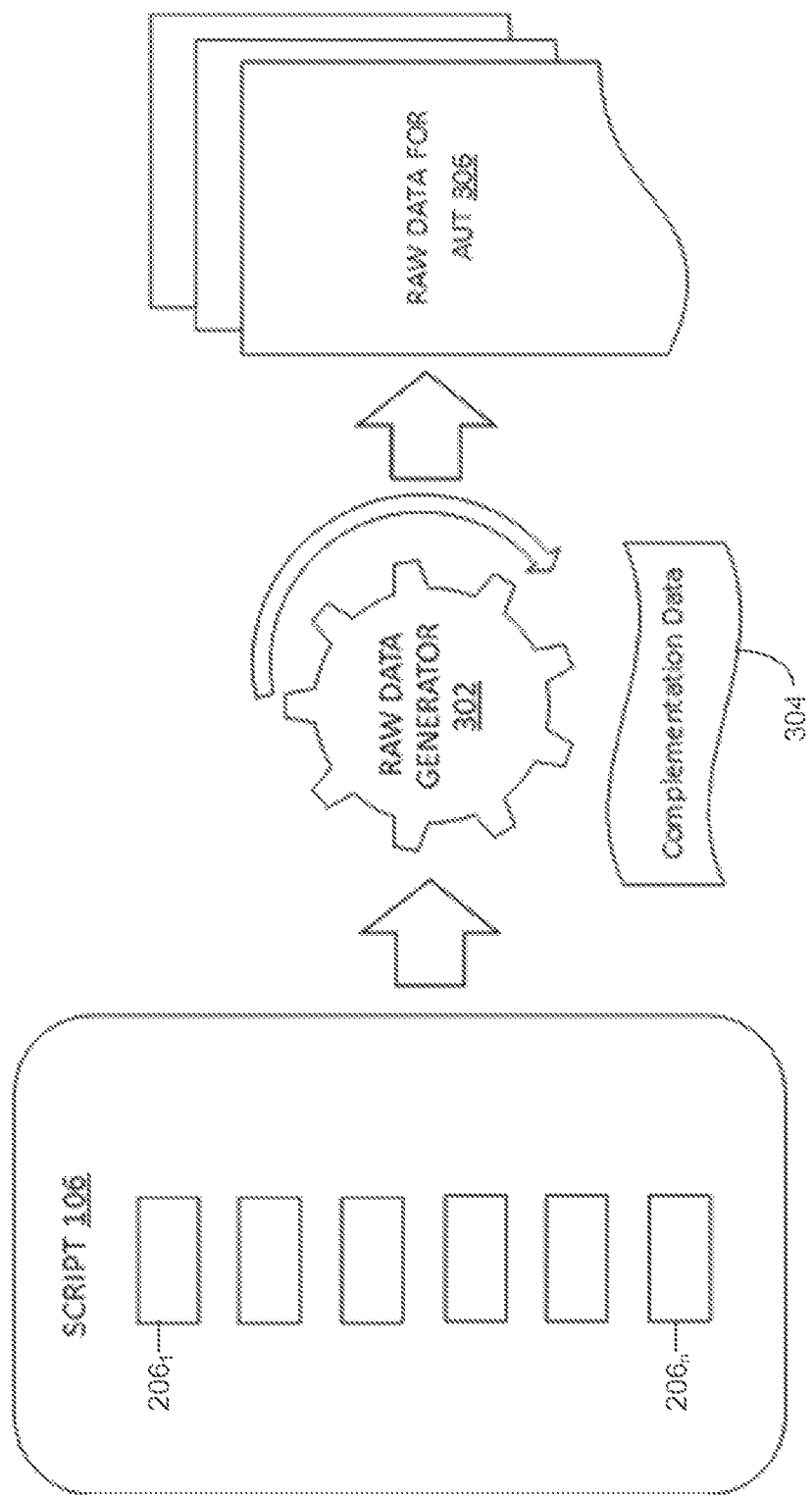
FIG. 3 illustrates the generation of raw data from executing a script via a raw data generator, according to one example.

FIG. 3 illustrates the generation of raw data 308 from executing a script 106 via a raw data generator 302, according to one example. The raw data 308 may be used for test automation purposes by emulating a user performing spatial gestures. The raw data 308 may be used to control/test aspects of the application under test as if the controls were generated from user motions/gestures captured by the capture device 110. The script 106 that is executed by the computing environment 102 may correspond to the script that is recorded as described in FIG. 2. However, the script 106 may also be written without recording user motions via the capture device 110.

Referring to FIG. 3, the first gesture $206_1$ may correspond to the waving of a hand. However, gesture $206_1$ may not indicate the waving of the right hand, as described above with reference to FIG. 2. As described with reference to FIGS. 1 and 2, gestures $206_1$-$206_n$ stored in the script 106 may correspond to the predefined gestures retrieved from the gesture database 104, which may have coordinates originating from a center of the field of view of the capture device 110 (e.g., x,y,z coordinates originating from (0,0,0)). In addition, the predefined gestures may include information indicating which extremities of the skeletal model may perform the gesture, as described above. Therefore, in order for gesture $206_1$ to emulate the user waving the right hand, complementation data 304 may be added to the raw data generator 302 while raw data 306 is generated. The complementation data 304 corresponding to gesture $206_1$ may include the extremities to apply the gesture to, and current positions of the extremities (or the original positions as described with reference to FIG. 2). As an example, the raw data generator 302 may apply an offset to the gesture $206_1$ to emulate movement of the extremities from their current positions. For example, if gesture $206_1$ has the points {(0,0,0), (1,2,3), (3,4,5)}, and it is desirable to apply the gesture to the right hand that is currently positioned at (2,2,2), then gesture $206_1$, after being processed by the raw data generator 302, may have the points {(2,2,2), (3,4,5), (5,8,7)}, by adding the coordinates of the right hand to the coordinates of gesture $206_1$. However, if it is desirable to apply gesture $206_1$, to the opposite extremity (e.g., the left hand), the x coordinate of gesture $206_1$ may be multiplied by (−1) before adding the offset (e.g., the current position of the left hand). Referring to the above example, the current position of the left hand may be added to {(0,0,0), (−1,2,3), (−3,4,5)} (i.e., after the x coordinate of gesture $206_1$ is multiplied by (−1)).

As an example, gestures $206_1$-$206_n$ may include distance and velocity parameters that correspond to the recorded gestures described above with reference to FIG. 2. For example, the distance parameter may correspond to the distance between the coordinates of the extremities moved between consecutive frames captured by the capture device 110, and the velocity parameter may correspond to the velocity at which the movements occur between the consecutive frames. As an example, the script 106 may allow for users to dynamically change the recorded gestures by changing the distance and velocity parameters.

Figure 4:
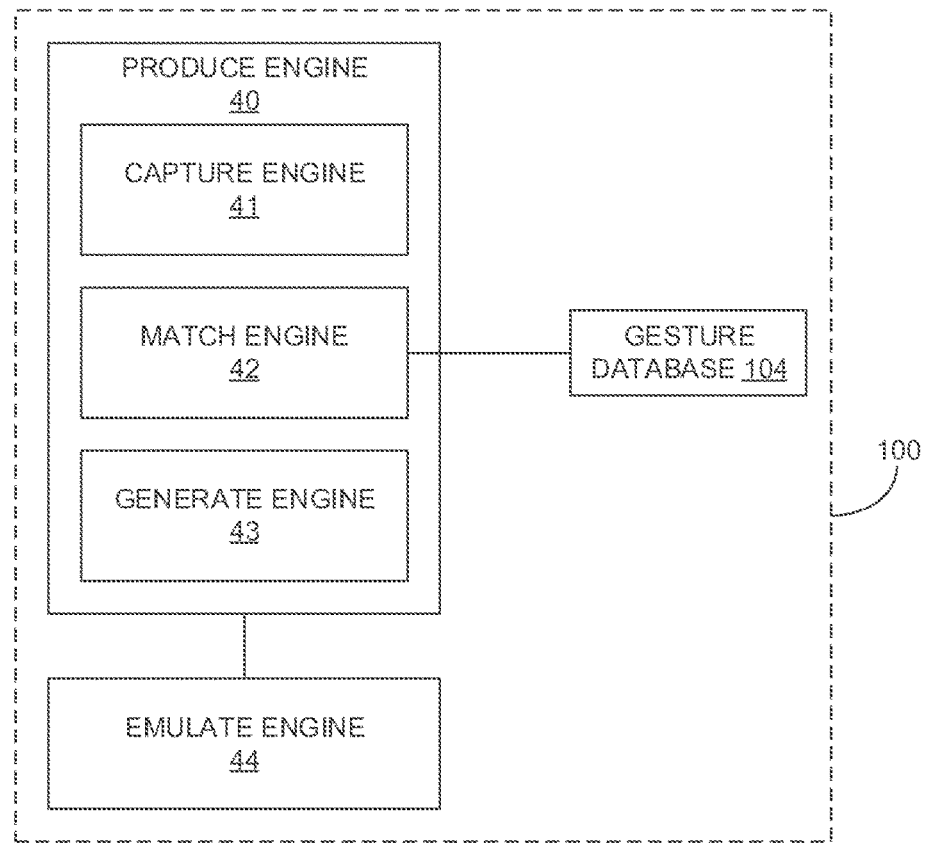
FIG. 4 is a block diagram depicting an example of components of a computing environment and a capture device.
Figure 5:
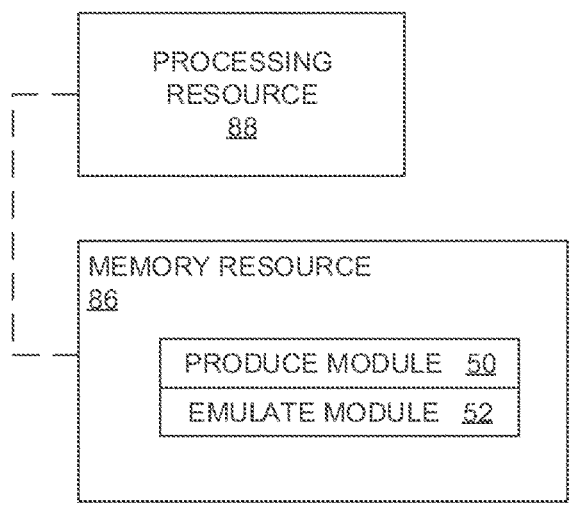
FIG. 5 is a block diagram depicting a memory resource and a processing resource, according to one example.

FIGS. 4-5 depict examples of physical and logical components for implementing various embodiments. In FIG. 4, various components are identified as engines 40-44, in describing engines 40-44, focus is on each engine's designated function. However, the term engine, as used herein, refers to a combination of hardware and programming configured to perform a designated function. As is illustrated later with respect to FIG. 5, the hardware of each engine, for example, may include one or both of a processor and a memory, while the programming is code stored on that memory and executable by the processor to perform the designated function. The programming can include an operating system and application. In addition, the hardware of each engine can include a display and any user input buttons.

FIG. 4 is a block diagram depicting components of environment 100, including at least a computing environment 102 and a capture device 110. In this example, the environment 100 includes produce engine 40 and emulate engine 44. The produce engine may include capture engine 41, match engine 42, and generate engine 43. In performing their respective functions, at least match engine 42 may access gesture database 104. Gesture database 104 represents generally any memory accessible to the environment 100 that may in general include a collection of gesture filters, each comprising information concerning a predefined gesture that may be performed by a skeletal model. The predefined gestures may include information indicating which extremities of the skeletal model may perform the gesture.

Produce engine 40 represents a combination of hardware and programming configured to produce scripts to emulate a user performing spatial gestures. Emulate engine 44 represents a combination of hardware and programming configured to emulate the user using the scripts. The produce engine may include capture engine 41, match engine 42, and generate engine 43.

Capture engine 41 represents a combination of hardware and programming configured to capture movement of extremities of a skeletal body corresponding to the user, wherein the movement is captured according to a change in coordinates of the extremities from an original position. Match engine 42 represents a combination of hardware and programming configured to match the movement of the extremities to a predefined gesture found in the gesture database 104. Generate engine 43 represents a combination of hardware and programming configured to generate a script from the matched predefined gesture with reference to the extremities captured and coordinates of the extremities from the original position, such that the user is emulated.

In foregoing discussion, engines 40-44 were described as combinations of hardware and programming. Engines 40-44 may be implemented in a number of fashions. Looking at FIG. 5, the programming may be processor executable instructions stored on tangible memory resource 88 and the hardware may include processing resource 88 for executing those instructions. Thus memory resource 86 can be said to store program instructions that when executed by processing resource 88 implement the components of the communications device of FIG. 4.

Memory resource 86 represents generally any number of memory components capable of storing instructions that can be executed by processing resource 88. Memory resource 86 is non-transitory in the sense that it does not encompass a transitory signal but instead is made up of one or more memory components configured to store the relevant instructions. Memory resource 86 may be implemented in a single device or distributed across devices. Likewise, processing resource 88 represents any number of processors capable of executing instructions stored by memory resource 86. Processing resource 88 may be integrated in a single device or distributed across devices. Further, memory resource 86 may be fully or partially integrated in the same device as processing resource 88, or it may be separate but accessible to that device and processing resource 88.

In one example, the program instructions can be part of an installation package that when installed can be executed by processing resource 88 to implement the components of the communications device of FIG. 4. In this case, memory resource 86 may be a portable medium such as a CD, DVD, or flash drive or a memory maintained by a server from which the installation package can be downloaded and installed. In another example, the program instructions may be part of an application or applications already installed. Here, memory resource 86 can include integrated memory such as a hard drive, solid state drive, or the like.

In FIG. 5, the executable program instructions stored in memory resource 88 are depicted as produce module 50 and emulate module 52. Produce module 50 represents program instructions that when executed cause processing resource 88 to implement produce engine 40 of FIG. 4. Likewise, emulate module 52 represents program instructions that when executed cause the implementation of emulate engine 44.

Figure 6:
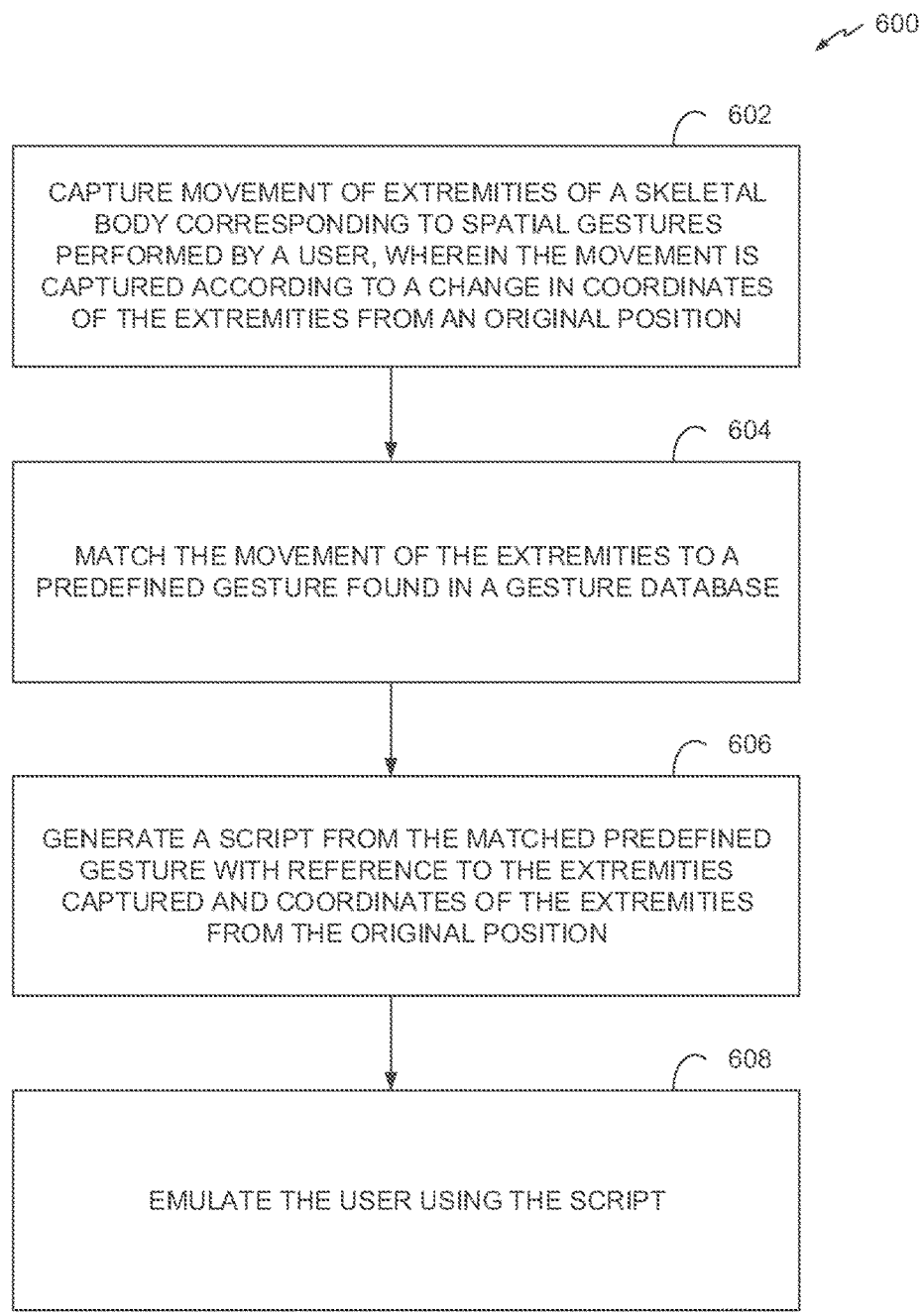
FIG. 6 is a flow diagram depicting steps taken to implement an example.

FIG. 6 is a flow diagram 800 of steps taken to implement a method. In discussing FIG. 6, reference may be made to FIGS. 1-3 and the components depicted in FIGS. 4-5. Such reference is made to provide contextual examples and not to limit the manner in which the method depicted by FIG. 6 may be implemented.

First, movement of extremities of a skeletal body corresponding to a user may be captured (step 602). As an example, the movement may be captured according to a change in coordinates of the extremities from an original position. The movement of the extremities may be matched to a predefined gesture found in a gesture database (step 604). A script may be generated from the matched predefined gesture with reference to the extremities captured and coordinates of the extremities from the original position (step 606). The user may be emulated using the script (step 608).

FIGS. 4-5 aid in depicting the architecture, functionality, and operation of various embodiments. In particular, FIGS. 4-5 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A computer-implemented method, comprising:
   capturing movement of extremities of a skeletal body corresponding to a user, wherein capturing the movement of extremities comprises determining a velocity and a distance of a change in coordinates of the extremities from an original position;
   matching the captured movement of extremities to a predefined gesture found in a gesture database;
   applying the matched predefined gesture to the captured movement of extremities;
   applying an offset to the matched predefined gesture to emulate the captured movement of extremities from the original position, wherein applying the offset includes adding the coordinates of the extremities from the original position to coordinates of the predefined gesture; and
   generating a script from the matched predefined gesture that is applied to the captured movement of extremities and that the offset is applied to; and
   executing the script to emulate the captured movement of the user for a software application under testing, wherein executing the script comprises modifying the matched predefined gesture to correspond to a playback velocity and a playback distance.

2. The method of claim 1, wherein applying the offset to the predefined gesture comprises:
   multiplying coordinates of the predefined gesture by −1 to generate coordinates for opposite extremities; and
   adding the coordinates of the extremities from the original position to the coordinates for the opposite extremities.

3. A system, comprising:
   a processing resource; and
   a storage device storing instructions that when executed cause the processing resource to:
      capture movement of extremities of a skeletal body corresponding to a user, wherein capturing the movement of extremities comprises determining a velocity and a distance of a change in coordinates of the extremities from an original position;
      match the captured movement of extremities to a predefined gesture found in a gesture database;
      apply the matched predefined gesture to the captured movement of extremities;
      apply an offset to the matched predefined gesture to emulate the captured movement of extremities from the original position, wherein applying the offset includes adding the coordinates of the extremities from the original position to coordinates of the predefined gesture; and generate a script from the matched predefined gesture that is applied to the captured movement of extremities and that the offset is applied to; and execute the script to emulate the captured movement of the user for a software application under testing, wherein to execute the script the matched predefined gesture is modified to correspond to a playback velocity and a playback distance.

4. A memory resource storing instructions that when executed cause a processing resource to:

capture movement of extremities of a skeletal body corresponding to a user, wherein capturing the movement of extremities comprises determining a velocity and a distance of a change in coordinates of the extremities from an original position;

match the captured movement of extremities to a predefined gesture found in a gesture database;

apply the matched predefined gesture to the captured movement of extremities;

apply an offset to the matched predefined gesture to emulate the captured movement of extremities from the original position, wherein applying the offset includes adding the coordinates of the extremities from the original position to coordinates of the predefined gesture; and generate a script from the matched predefined gesture that is applied to the captured movement of extremities and that the offset is applied to; and execute the script to emulate the captured movement of the user for a software application under testing, wherein to execute the script the matched predefined gesture is modified to correspond to a playback velocity and a playback distance.

\* \* \* \* \*